(12) United States Patent
Sasaki et al.

(10) Patent No.: US 7,660,057 B2
(45) Date of Patent: Feb. 9, 2010

(54) LENS ASSEMBLY AND IMAGING APPARATUS

(75) Inventors: Naoki Sasaki, Saitama (JP); Takeshi Yamada, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/395,907

(22) Filed: Mar. 2, 2009

(65) Prior Publication Data

US 2009/0244733 A1    Oct. 1, 2009

(30) Foreign Application Priority Data

Mar. 28, 2008 (JP) .................... P2008-088519

(51) Int. Cl.
*G02B 7/02* (2006.01)
*G02B 7/18* (2006.01)
*G02B 23/16* (2006.01)
*G02B 17/08* (2006.01)

(52) U.S. Cl. .............. 359/825; 359/819; 359/830; 359/512; 359/513; 396/25; 396/27; 348/81; 348/207.99; 600/109

(58) Field of Classification Search ........... 359/811, 359/819, 820, 825, 829, 830, 892, 401, 402, 359/478, 480, 502, 507–509, 512, 513; 396/12, 396/25–28, 72, 73, 75, 85, 89; 348/81–84, 348/207.99, 373; 353/100, 101; 600/112, 600/131–134, 160, 178, 199; 425/472, 808; 451/460

See application file for complete search history.

(56) References Cited

U.S. PATENT DOCUMENTS

| 5,077,567 | A | * | 12/1991 | Haraguchi et al. | ............ 396/29 |
| 5,894,369 | A | * | 4/1999 | Akiba et al. | ................ 359/820 |
| 5,898,527 | A | * | 4/1999 | Sawai et al. | ................ 359/819 |
| 6,266,143 | B1 | * | 7/2001 | Peterson et al. | ............ 356/399 |
| 6,507,700 | B1 | | 1/2003 | Takekuma et al. | |

FOREIGN PATENT DOCUMENTS

JP        2002-90603 A    3/2002

* cited by examiner

*Primary Examiner*—Loha Ben
(74) *Attorney, Agent, or Firm*—Birch, Stewart, Kolasch & Birch, LLP

(57) ABSTRACT

Areas 11_1a, being in contact with an O-ring 13, of an outer peripheral surface of a taking lens 11_1 and an area 12a, being in contact with the O-ring 13, of an inner surface of a lens frame 12 are formed in taper shapes having slopes with respect to an optical axis of the taking lens 11_1 in a section taken along a plane including the optical axis. The O-ring 13 is disposed in contact with the areas 11_1a and 12a, which are formed in the taper shapes, of both of the outer peripheral surface of the taking lens 11_1 and the inner surface of the lens frame 12. Also, the O-ring 13 is pressed in directions of arrows P and P' by the outer peripheral surface of the taking lens 11_1 and the inner surface of the lens frame 12.

8 Claims, 7 Drawing Sheets

LENS ASSEMBLY AND IMAGING APPARATUS

CROSS-REFERENCE TO RELATED APPLICATIONS

This application is based upon and claims the benefit of priority from the Japanese Patent Application No. 2008-88519 filed on Mar. 28, 2008; the entire contents of which are incorporated herein by reference.

BACKGROUND OF THE INVENTION

1. Technical Field

The invention relates to a lens assembly equipped with a lens for forming an image using subject light on an imaging device and to an imaging apparatus having the lens assembly.

2. Description of the Related Art

Recently, cameras become mounted in vehicles. Cameras provided in vehicles are used as surveillance cameras or as driving-assistance cameras. Since display screens have been provided on driver's seats as navigation systems have become popular, the latter case is intended to display an image taken by the camera on the display screen.

In such on-board cameras, most of those are required to have waterproof performance since those are mainly used outside of vehicles. In order to achieve sufficient waterproof performance without an increase in camera size in accordance with the requirement, it has been attempted to provide, in the on-board cameras, small-sized lens assemblies excellent in waterproof performance.

FIG. 6 is a view illustrating a section of a related-art lens assembly taken along an optical axis of a taking lens. FIG. 7 is an enlarged section view illustrating a part, in which an O-ring is disposed, of the lens assembly shown in FIG. 6.

FIG. 6 shows a lens assembly 100 including a taking lens 101_1 of a first group, a taking lens 101_2 of a second group, a taking lens 101_3 of a third group, and a taking lens 101_4 of a fourth group in order from an incident side of subject light A. Furthermore, FIG. 6 shows a lens frame 102 housing these taking lenses 101_1, 101_2, 101_3, and 101_4 and an O-ring 103 disposed between the taking lens 101_1 and the lens frame 102. Specifically, as shown in FIG. 7, the taking lens 101_1 includes an object-side outer peripheral surface 101_1a and an image-side outer peripheral surface 101_1b having a diameter smaller by one step than that of the outer peripheral surface 101_1a. On the other hand, the lens frame 102 includes an inner surface 102a. The O-ring 103 is fitted to the image-side outer peripheral surface 101_1b, and the O-ring 103 is disposed with being pressed in directions of arrows P and P' by the outer peripheral surface 101_1b and the inner surface 102a. The O-ring 103 is a rubber member that exhibits waterproof performance after the taking lens 101_1 is housed in the lens frame 102. Also, examples of a material of the O-ring 103 include an ethylene propylene based rubber, a silicon rubber, and the like.

Also, JP 2002-90603 A (corresponding to U.S. Pat. No. 6,507,700) has proposed a lens assembly in which a protrusion of a leading end of the lens frame is caulked on the front surface side of the taking lens in the way of thermal adhesion in a state where the O-ring disposed between the outer peripheral surface of the taking lens and the inner wall surface of the lens frame is pressed.

The above-described O-ring, which is a rubber member exhibiting waterproof performance, is molded by jointing two molds. Hence, the molded O-ring has parting lines incidentally formed on a boundary part between these two molds. Protrusion shaped burrs are easily formed on the parting lines. The O-ring is disposed so that the protrusion shaped burrs are located on the outer peripheral surface side of the taking lens and on the inner surface side of the lens frame. Therefore, if the O-ring is pressed by the outer peripheral surface of the taking lens and the inner surface of the lens frame, the O-ring main body is pressed from above the protrusion shaped burrs. In this case, the protrusion shaped burrs may be embedded in the O-ring main body or the O-ring may get twisted. Accordingly, since it is hard to uniformly press the O-ring, it is hard to secure close contact between the outer peripheral surface of the taking lens and the O-ring and close contact between the inner surface of the lens frame and the O-ring. As a result, it is hard to sufficiently secure waterproof performance between the taking lens and the O-ring and waterproof performance between the lens frame and the O-ring.

SUMMARY OF THE INVENTION

In view of the above circumstances, the invention provides a lens assembly that is improved in waterproof performance and an imaging apparatus.

According to an aspect of the invention, a lens assembly includes a lens, a lens frame that houses the lens, and an O-ring that is disposed between an outer peripheral surface of the lens and an inner surface of the lens frame. An area, being in contact with the O-ring, of the outer peripheral surface of the lens and an area, being in contact with the O-ring, of the inner surface of the lens frame are formed in taper shapes having slopes with respect to an optical axis of the lens in a section taken along a plane including the optical axis.

In the above lens assembly, the area, being in contact with the O-ring, of the outer peripheral surface of the lens and the area, being in contact with the O-ring, of the inner surface of the lens frame are formed in the taper shapes having the slopes with respect to the optical axis of the lens in a section taken along the plane including the optical axis. Thus, the O-ring is disposed in contact with the areas, which are formed in the taper shapes, on both of the outer peripheral surface of the lens and the inner surface of the lens frame. That is, the O-ring is disposed so that parts of the O-ring other than the parting line (the protrusion shaped burrs) incidentally formed at the time of molding are in contact with the areas on both of the outer peripheral surface of the lens and the inner surface of the lens frame. The O-ring disposed on the position mentioned above is pressed by the outer peripheral surface of the lens and the inner surface of the lens frame. Thus, the O-ring main body is not pressed from above the protrusion shaped burrs, and the protrusion shaped burrs are not embedded in the O-ring main body or the O-ring does not get twisted. Therefore, it is possible to uniformly press the O-ring. As a result, the outer peripheral surface of the lens and the O-ring are in sufficiently close contact with each other, and waterproof performance between the outer peripheral surface of the lens and the O-ring is sufficiently secured. Furthermore, the inner surface of the lens frame and the O-ring are in sufficiently close contact with each other, and waterproof performance between the inner surface of the lens frame and the O-ring is sufficiently secured. Accordingly, it is possible to provide a lens assembly improved in waterproof performance.

Also, it is preferable that the areas are formed in the taper shapes, which have straight slopes in the section.

In this manner, the areas can be easily formed in the taper shapes.

Furthermore, it is preferable that the areas are formed in the taper shapes, which have curved slopes in the section.

In this manner, the areas can be formed in the taper shapes having the curved slopes appropriate to a section shape of the O-ring. Accordingly, it is possible to sufficiently press the O-ring.

Furthermore, it is also preferable that the areas are formed in the taper shapes having slopes that are curved in such a direction as to narrow a space between the outer peripheral surface of the lens and the inner surface of the lens frame as the areas are distant from a position of the O-ring in the section.

In this manner, it is possible to stabilize a position in which the O-ring is disposed.

According to another aspect of the invention, an imaging apparatus includes the lens assembly according described above and an imaging device.

The above imaging apparatus includes the lens assembly. Thus, its waterproof performance is improved.

According to the above configurations, it is possible to provide a lens assembly improved in waterproof performance and an imaging apparatus.

DETAILED DESCRIPTION OF EMBODIMENTS OF THE INVENTION

Hereinafter, embodiments of the invention will be described with reference to accompanying drawings.

Figure 1:
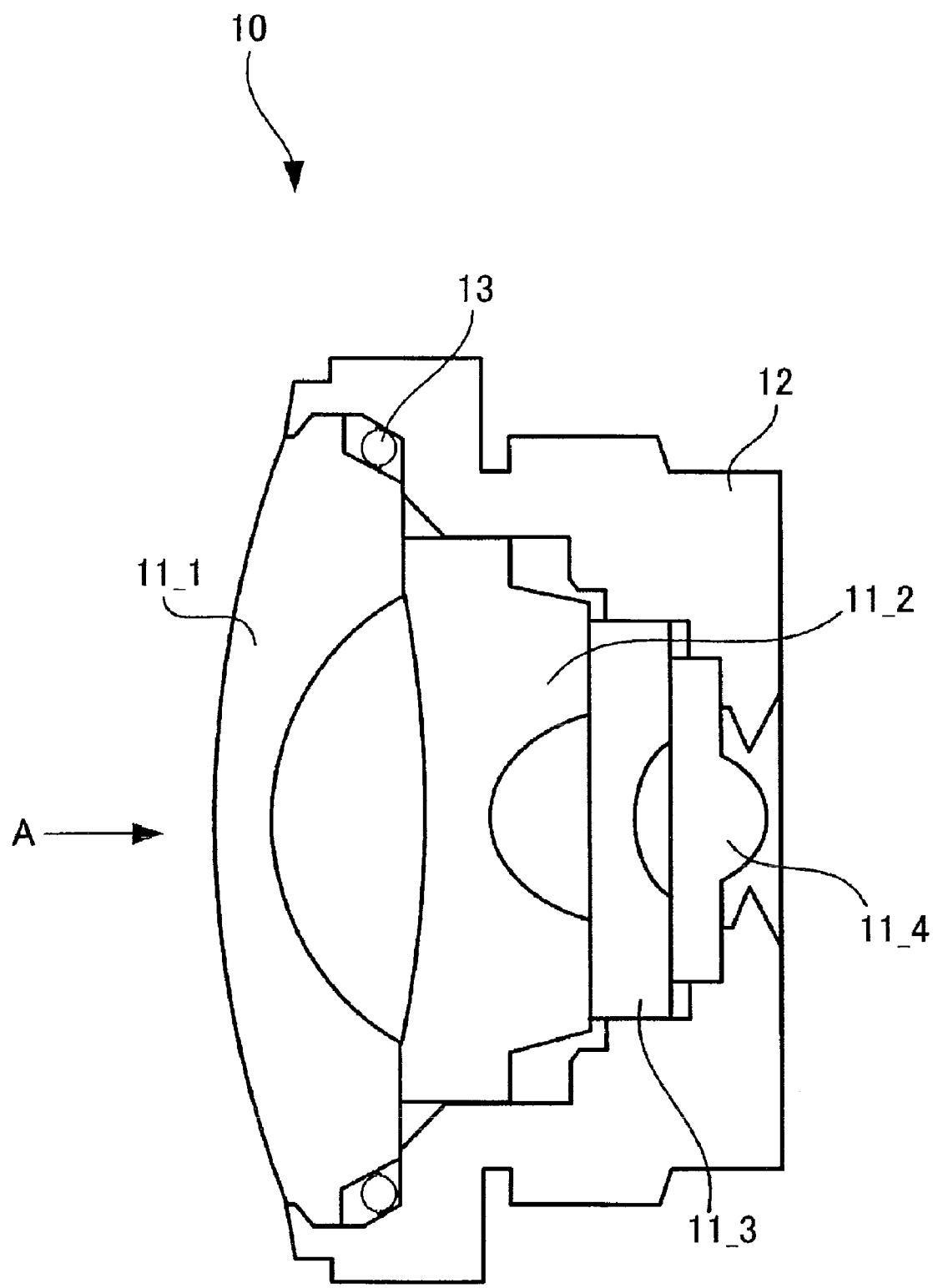
FIG. 1 is a view illustrating a section of a lens assembly according to a first embodiment of the invention, in which the section includes an optical axis of a taking lens.
Figure 2:
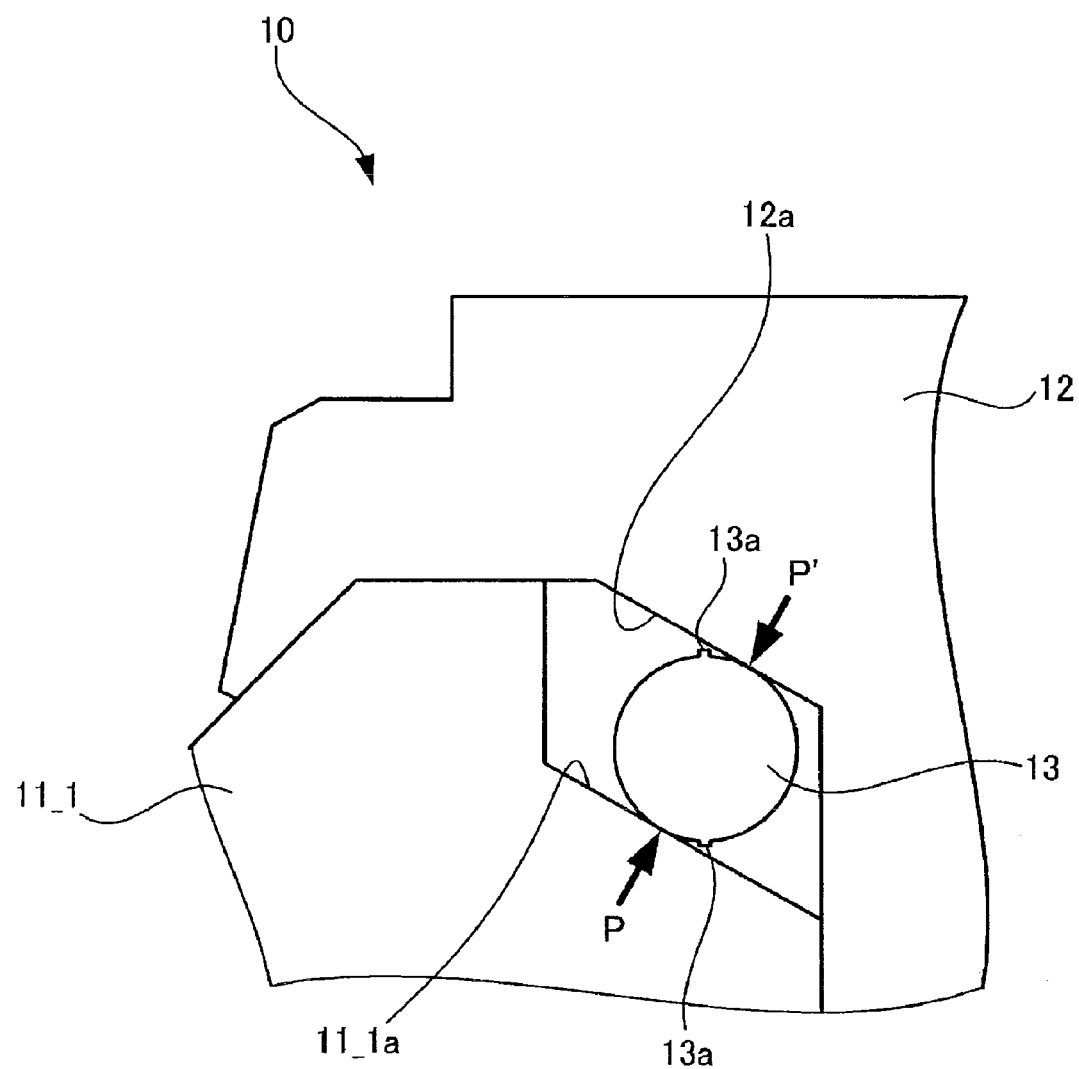
FIG. 2 is an enlarged sectional view illustrating a part, in which an O-ring is disposed, of the lens assembly shown in FIG. 1.

FIG. 1 is a view illustrating a section of a lens assembly according to a first embodiment of the invention, in which the section includes an optical axis of a taking lens. FIG. 2 is an enlarged sectional view illustrating a part, in which an O-ring is disposed, of the lens assembly shown in FIG. 1.

A lens assembly 10 according to the first embodiment shown in FIG. 1 includes a taking lens 11_1 of a first group, a taking lens 11_2 of a second group, a taking lens 11_3 of a third group, and a taking lens 11_4 of a fourth group in order from the incident side of subject light A. Furthermore, the lens assembly 10 includes a lens frame 12 for housing the taking lenses 11_1, 11_2, 11_3, and 11_4. Further, the lens assembly 10 includes an O-ring 13 that is disposed between the taking lens 11_1 and the lens frame 12. The O-ring 13 is a rubber member that exhibits waterproof performance. Furthermore, a material of the O-ring 13 is an ethylene propylene based rubber, a silicon rubber, or the like.

Specifically, as shown in FIG. 2, an outer peripheral surface of the taking lens 11_1 includes an area 11_1a. The area 11_1a is formed in a taper shape having a straight slope with respect to an optical axis of the taking lens 11_1 in a section taken along a plane including the optical axis of the taking lens 11_1. Furthermore, an inner surface of the lens frame 12 includes an area 12a. The area 12a is formed in a taper shape having a straight slope with respect to the optical axis of the taking lens 11_1 in the section taken along the plane including the optical axis of the taking lens 11_1.

Furthermore, as shown in FIG. 2, the O-ring 13 includes a protrusion shaped burr 13a that is a parting line incidentally formed at the time of molding the O-ring 13.

In the lens assembly 10 according to the first embodiment, as described above, the area 11_1a, being in contact with the O-ring 13, of the outer peripheral surface of the taking lens 11_1 and the area 12a, being in contact with the O-ring 13, of the inner surface of the lens frame 12 are formed in the taper shapes having the slopes with respect to the optical axis of the taking lens 11_1 in the section taken along the plane including the optical axis. Hence, the O-ring 13 is disposed in contact with the areas 11_1a and 12a, which are formed in the taper shapes, of both of the outer peripheral surface of the taking lens 11_1 and the inner surface of the lens frame 12. That is, the O-ring 13 is disposed so that parts, which are indicated by the arrows P and P', other than the protrusion shaped burr 13a are in contact with the areas 11_1a and 12a of the outer peripheral surface of the taking lens 11_1 and the inner surface of the lens frame 12. The O-ring 13 disposed in such a position is pressed in the directions of the arrows P and P' by the outer peripheral surface of the taking lens 11_1 and the inner surface of the lens frame 12. Hence, the O-ring main body is not pressed from above the protrusion shaped burr 13a, and thus the protrusion shaped burr 13a is not embedded in the O-ring main body nor does the O-ring 13 get twisted. Therefore, it is possible to uniformly press the O-ring 13. As a result, the outer peripheral surface of the taking lens 11_1 and the O-ring 13 are in sufficiently close contact with each other, and waterproof performance between the outer peripheral surface of the taking lens 11_1 and the O-ring 13 is sufficiently secured. Also, the inner surface of the lens frame 12 and the O-ring 13 are in sufficiently close contact with each other, and waterproof performance between the inner surface of the lens frame 12 and the O-ring 13 is sufficiently secured. Accordingly, it is possible to provide a lens assembly 10 improved in waterproof performance.

Figure 3:
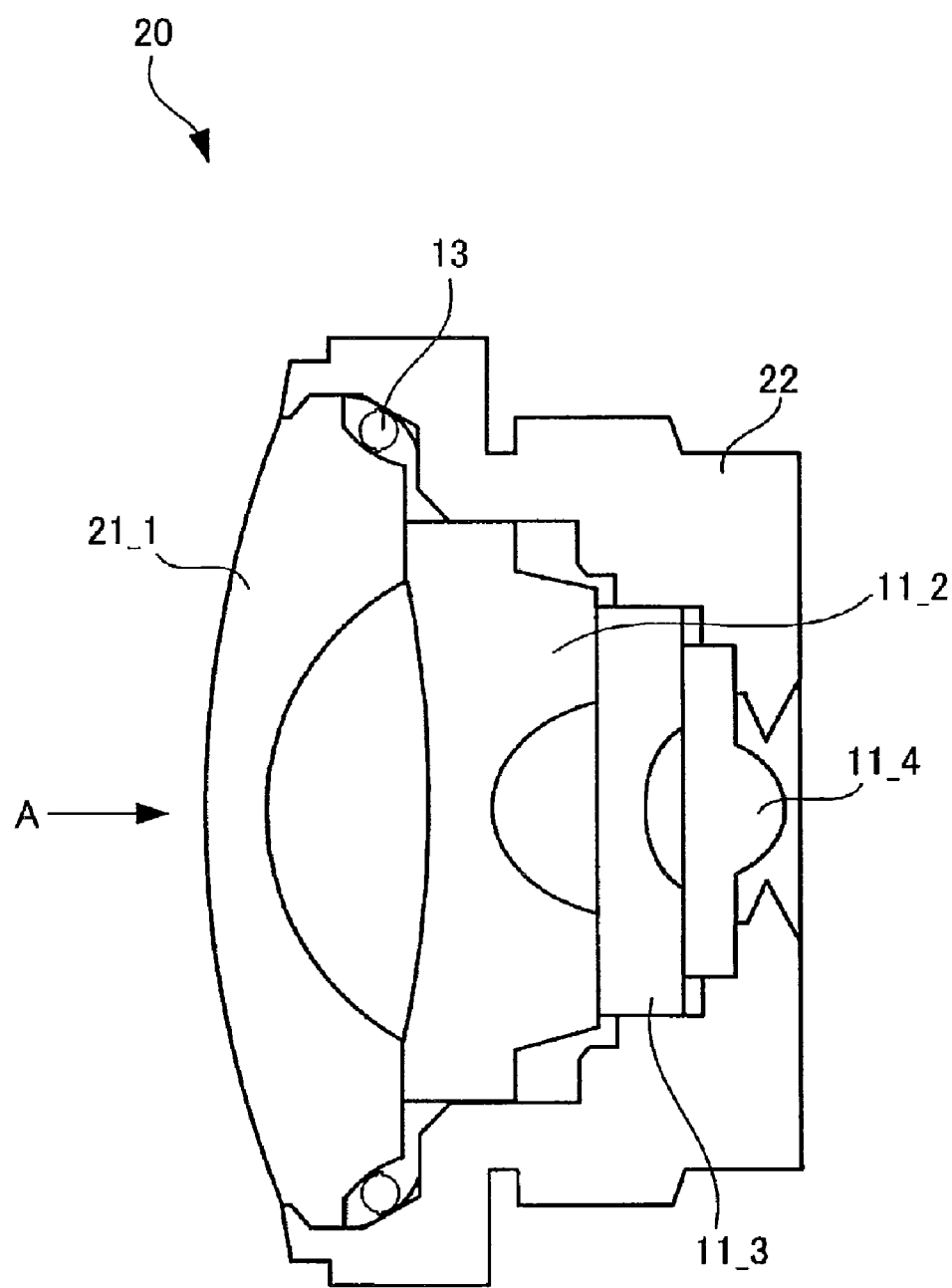
FIG. 3 is a view illustrating a section of a lens assembly according to a second embodiment of the invention, in which the section includes an optical axis of a taking lens.
Figure 4:
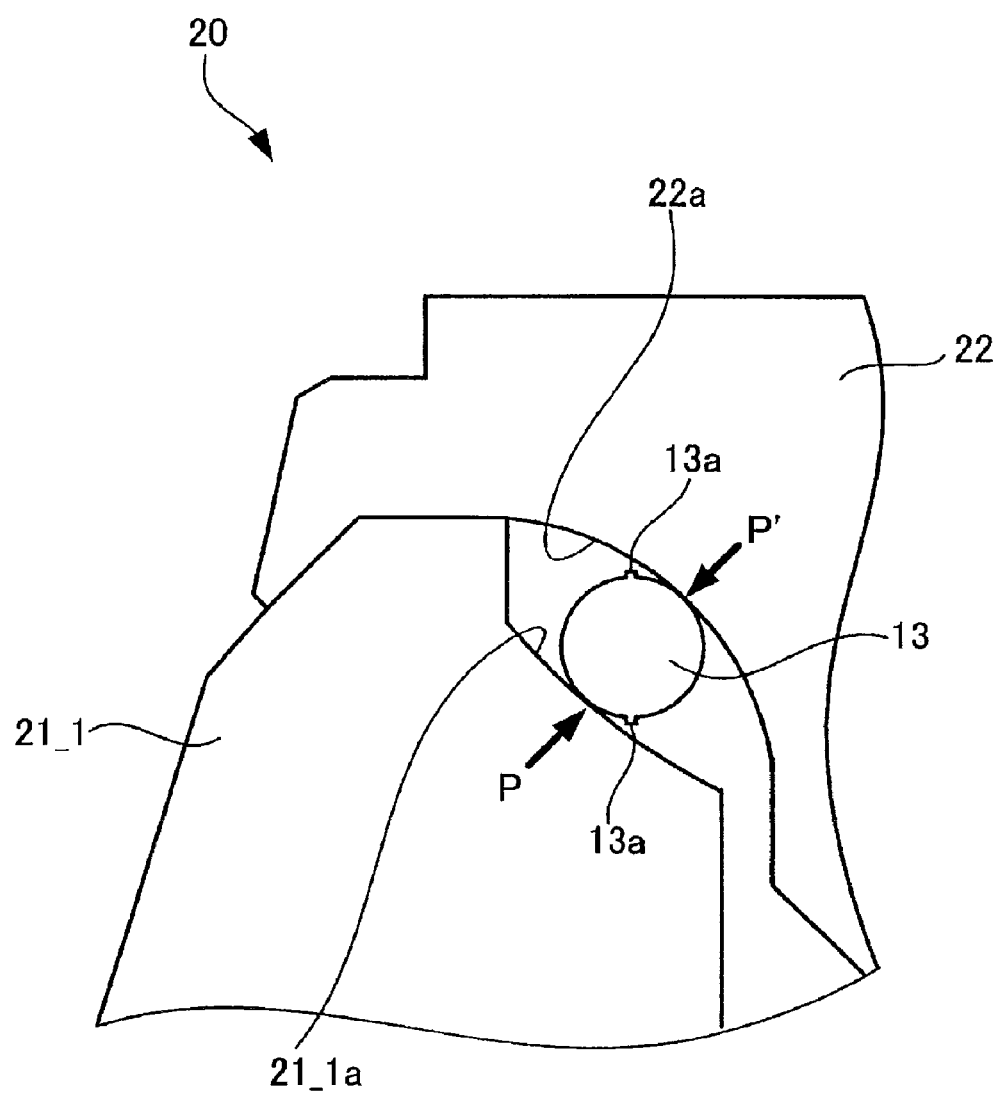
FIG. 4 is an enlarged sectional view illustrating a part, in which an O-ring is disposed, of the lens assembly shown in FIG. 3.

FIG. 3 is a view illustrating a section of a lens assembly according to a second embodiment of the invention, in which the section includes an optical axis of a taking lens. FIG. 4 is an enlarged sectional view illustrating a part, in which an O-ring is disposed, of the lens assembly shown in FIG. 3.

Furthermore, in the following description, elements that are the same as those of the lens assembly 10 shown in FIGS. 1 and 2 will be referenced by the same reference numerals and signs, and differences therebetween will be described.

A lens assembly 20 according to the second embodiment shown in FIG. 3 includes a taking lens 21_1 of a first group, a taking lens 11_2 of a second group, a taking lens 11_3 of a third group, and a taking lens 11_4 of a fourth group in order from the incident side of subject light A. Furthermore, the lens assembly 20 includes a lens frame 22 that houses the taking lenses 21_1, 11_2, 11_3, and 11_4. Further, the lens assembly 20 includes an O-ring 13 disposed between the taking lens 21_1 and the lens frame 22.

As shown in FIG. 4, an outer peripheral surface of the taking lens 21_1 includes an area 21_1a. The area 21_1a is formed in a taper shape having a curved slope with respect to an optical axis in a section taken along a plane including the optical axis of the taking lens 21_1. Specifically, the area 21_1a is formed in a taper shape having a slope curved in a direction in which a space between the outer peripheral surface of the taking lens 21_1 and the inner surface of the lens frame 22 becomes narrower as the distance from the position of the O-ring 13 increases.

Furthermore, the inner surface of the lens frame 22 includes an area 22a. The area 22a is also formed in a taper shape having a curved slope with respect to the optical axis in a section taken along a plane including an optical axis of the taking lens 21_1. Specifically, the area 22a is also formed in the taper shape having the slope, which is curved in such a direction as to narrow a space between the outer peripheral surface of the taking lens 21_1 and the inner surface of the lens frame 22 as the area 22a is distant from the position of the O-ring 13.

In the lens assembly 20 according to the second embodiment, as described above, the area 21_1a, being in contact with the O-ring 13, of the outer peripheral surface of the taking lens 21_1 and the area 22a, being in contact with the O-ring 13, of the inner surface of the lens frame 22 are formed in the taper shapes having the curved slopes in the section. Hence, the O-ring 13 is disposed in contact with the areas 21_1a and 22a, which are formed in the taper shapes, of the outer peripheral surface of the taking lens 21_1 and the inner surface of the lens frame 22. That is, the O-ring 13 is disposed so that parts, which are indicated by the arrows P and P', other than the protrusion shaped burr 13a are in contact with the areas 21_1a and 22a of the outer peripheral surface of the taking lens 21_1 and the inner surface of the lens frame 22. Furthermore, as described above, the areas 21_1a and 22a are formed in the taper shapes having the curved slopes in such the direction as to narrow the space between the outer peripheral surface of the taking lens 21_1 and the inner surface of the lens frame 22 as the areas 21_1a and 22a are distant from the position of the O-ring 13. Thus, it is possible to stabilize the position in which the O-ring 13 is disposed.

The O-ring 13 disposed in such a position is pressed in the directions of the arrows P and P' by the outer peripheral surface of the taking lens 21_1 and the inner surface of the lens frame 22. Thus, the O-ring main body is not pressed from above the protrusion shaped burr 13a, and thus the protrusion shaped burr 13a is not embedded in the O-ring main body nor does the O-ring 13 get twisted. Therefore, it is possible to uniformly press the O-ring 13. As a result, the outer peripheral surface of the taking lens 21_1 and the O-ring 13 are in more sufficiently close contact with each other, and waterproof performance between the outer peripheral surface of the taking lens 21_1 and the O-ring 13 can be more sufficiently secured. Furthermore, the inner surface of the lens frame 22 and the O-ring 13 are in more sufficiently close contact with each other, and waterproof performance between the inner surface of the lens frame 22 and the O-ring 13 can be more sufficiently secured. Accordingly, it is possible to provide the lens assembly 20 improved in waterproof performance.

Figure 5:
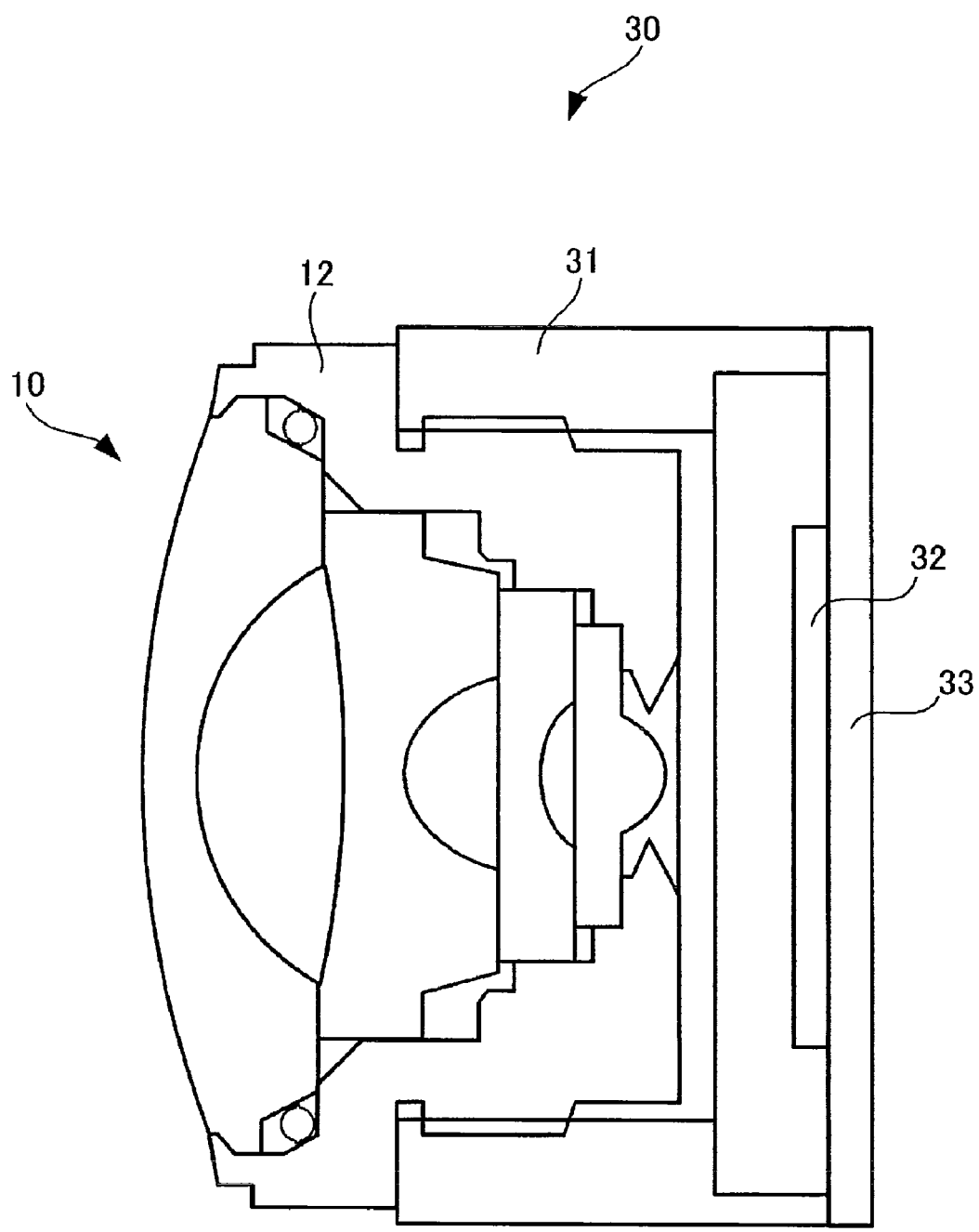
FIG. 5 is a view illustrating a section of a camera unit having the lens assembly shown in FIG. 1, in which the section includes the optical axis of the taking lens.
Figure 6:
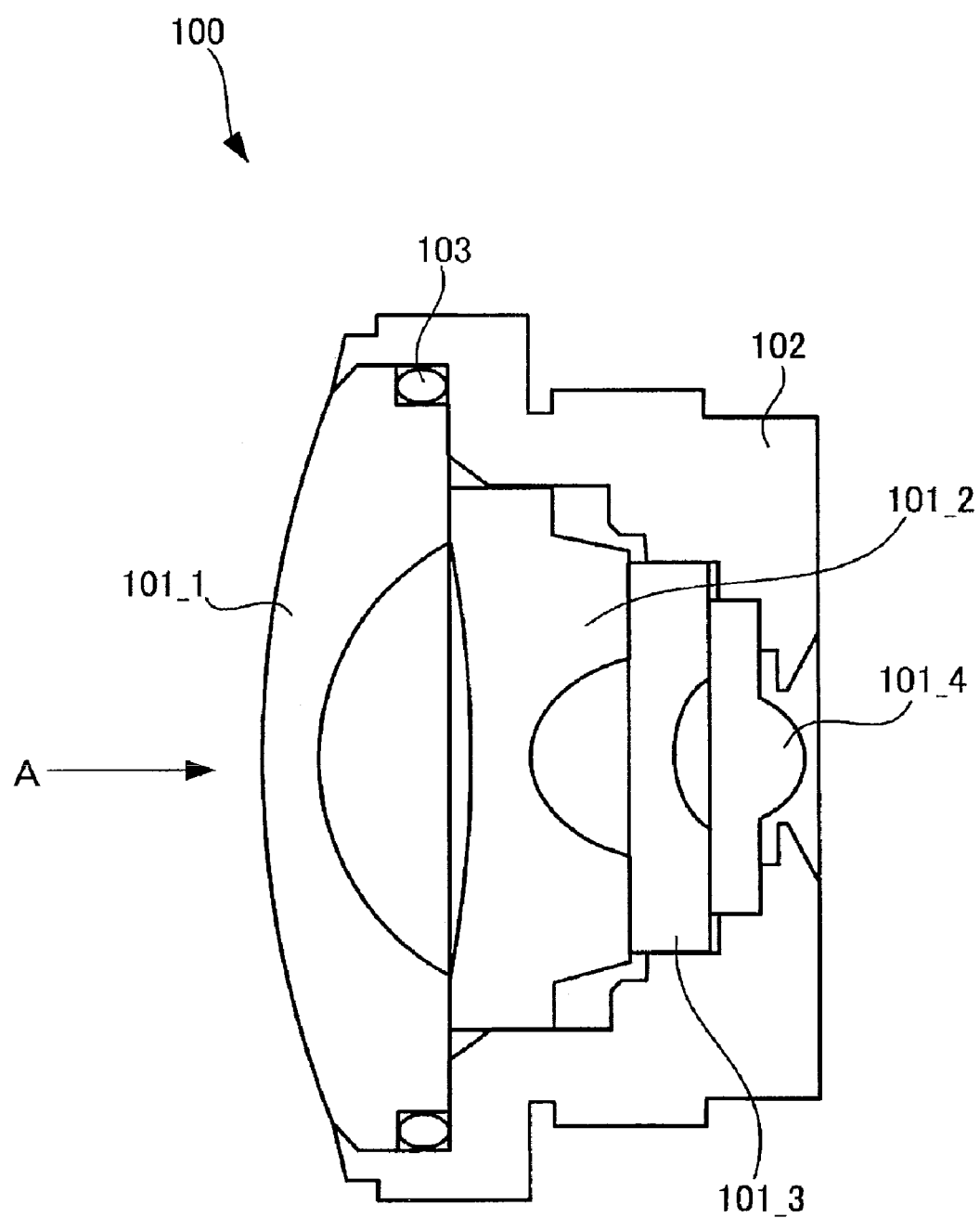
FIG. 6 is a view illustrating a section of a related-art lens assembly, in which the section includes an optical axis of a taking lens.
Figure 7:
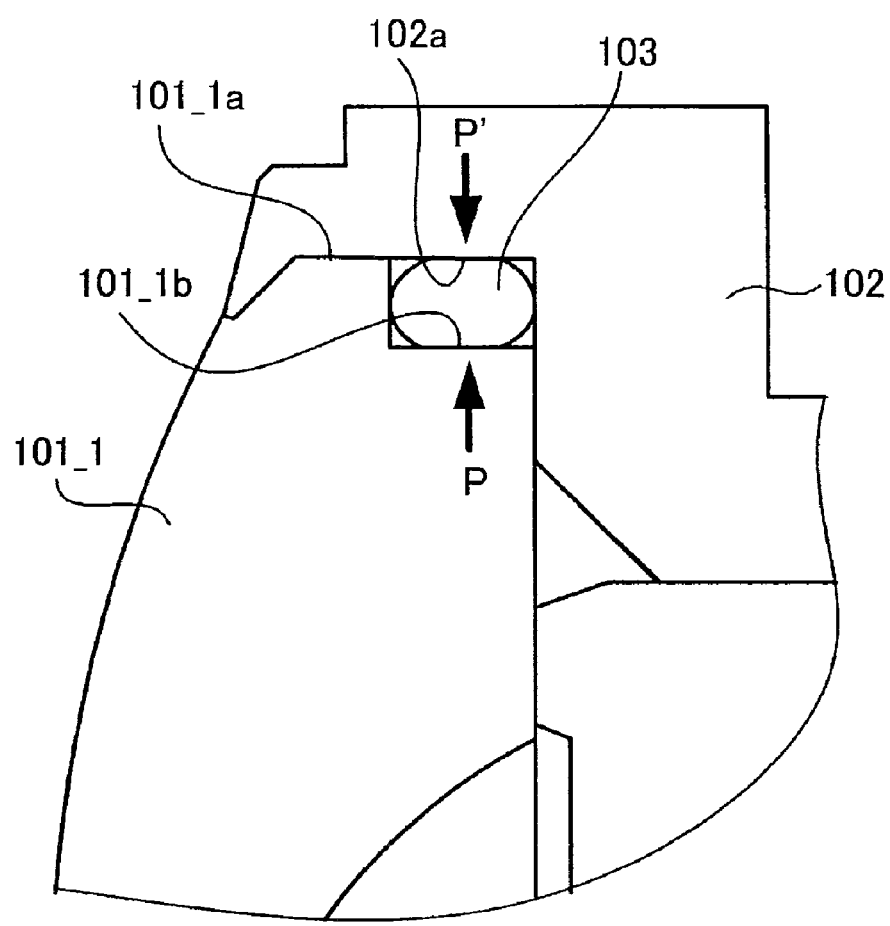
FIG. 7 is an enlarged section view illustrating a part, in which an O-ring is disposed, of the lens assembly shown in FIG. 6.

FIG. 5 is a view illustrating a section of a camera unit having the lens assembly shown in FIG. 1, in which the section includes the optical axis of the taking lens.

The camera unit 30 shown in FIG. 5 is an imaging apparatus according to one embodiment of the invention. The camera unit 30 includes the lens assembly 10 shown in FIG. 1, a camera main frame 31, an imaging device 32, and a substrate 33.

To assemble the camera unit 30, the lens assembly 10 is inserted into the camera main frame 31, and the lens assembly 10 is fixedly adhered to the camera main frame 31. In this case, an adhesive is applied between an outer periphery of the lens frame 12 and an inner periphery of an anterior end of the camera main frame 31. Thereby, a waterproof treatment is performed so that water is prevented from penetrating into the camera unit 30 from the anterior end side thereof.

Furthermore, the substrate 33 provided with the imaging device 32 such as CCD is fixedly adhered to the camera main frame 31. In this manner, the camera unit 30 is assembled. Hence, a waterproof performance of the camera unit 30 is improved.

What is claimed is:

1. A lens assembly comprising:
    a lens;
    a lens frame that houses the lens; and
    an O-ring that is disposed between an outer peripheral surface of the lens and an inner surface of the lens frame, wherein
    an area, being in contact with the O-ring, of the outer peripheral surface of the lens and an area, being in contact with the O-ring, of the inner surface of the lens frame are formed in taper shapes having slopes with respect to an optical axis of the lens in a section taken along a plane including the optical axis.

2. The lens assembly according to claim 1, wherein the areas are formed in the taper shapes, which have straight slopes in the section.

3. An imaging apparatus comprising:
    the lens assembly according to claim 2; and
    an imaging device.

4. The lens assembly according to claim 1, wherein the areas are formed in the taper shapes, which have curved slopes in the section.

5. An imaging apparatus comprising:
    the lens assembly according to claim 4; and
    an imaging device.

6. The lens assembly according to claim 4, wherein the areas are formed in the taper shapes having slopes that are curved in such a direction as to narrow a space between the outer peripheral surface of the lens and the inner surface of the lens frame as the areas are distant from a position of the O-ring in the section.

7. An imaging apparatus comprising:
    the lens assembly according to claim 6; and
    an imaging device.

8. An imaging apparatus comprising:
    the lens assembly according to claim 1; and
    an imaging device.

* * * * *